(12) United States Patent
Yamaguchi et al.

(10) Patent No.: US 6,711,929 B2
(45) Date of Patent: Mar. 30, 2004

(54) METHOD AND APPARATUS FOR ADJUSTING LOAD APPLIED BY SUSPENSION (75) Inventors: Satoshi Yamaguchi, Tokyo (JP); Ekihiro Nakae, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/053,906

(22) Filed: Jan. 24, 2002

(65) Prior Publication Data

US 2002/0116978 A1 Aug. 29, 2002

(30) Foreign Application Priority Data

Feb. 28, 2001 (JP) ........................................ 2001-055388

(51) Int. Cl.[7] .............................................. B21D 37/16
(52) U.S. Cl. ...................... 72/342.1; 72/38; 72/342.94; 219/121.6; 219/121.85
(58) Field of Search .................... 72/38, 342.1, 342.94; 219/121.6, 121.65, 121.66, 121.73, 121.78, 121.79, 121.8, 121.81, 121.85; 29/603.01

(56) References Cited

U.S. PATENT DOCUMENTS

| 4,304,978 A | * | 12/1981 | Saunders | ................ | 219/121.6 |
| 4,461,947 A | * | 7/1984 | Ward | ..................... | 219/121.6 |
| 4,603,567 A | | 8/1986 | Smith et al. | | |
| 5,297,413 A | | 3/1994 | Schones et al. | | |
| 5,588,200 A | * | 12/1996 | Schudel | .................... | 29/603.01 |
| 6,011,239 A | * | 1/2000 | Singh et al. | ............. | 219/121.6 |
| 6,459,549 B1 | | 10/2002 | Tsuchiya et al. | | |

FOREIGN PATENT DOCUMENTS

| JP | 63-303237 | 12/1988 | | |
| JP | 1-227279 | 9/1989 | | |
| JP | A 3-178021 | 8/1991 | | |
| JP | 3-192586 | 8/1991 | | |
| JP | 5-189906 | * 1/1992 | ............. | 72/342.94 |
| JP | A 5-159501 | 6/1993 | | |
| JP | A 5-189906 | 7/1993 | | |
| JP | A 9-288874 | 11/1997 | | |
| JP | A 10-269538 | 10/1998 | | |
| JP | 2001-043647 | 2/2001 | | |

* cited by examiner

Primary Examiner—Ed Tolan
(74) Attorney, Agent, or Firm—Oliff & Berridge, PLC (57) ABSTRACT A load applied to a slider by a suspension is adjusted as follows. First, the suspension is held while no external force to bend the suspension is applied to the suspension. Then, in this state, a position of a load beam is measured with a position measuring instrument. From the information on the position, a pitch angle of the load beam is determined, and conditions for laser light irradiation are determined from the pitch angle. Under the conditions thus determined, laser light is projected onto the front face or the rear face of a bent section of the load beam of the suspension.

21 Claims, 11 Drawing Sheets

METHOD AND APPARATUS FOR ADJUSTING LOAD APPLIED BY SUSPENSION

BACKGROUND OF THE INVENTION

1. Field of the Invention

The present invention relates to a method and an apparatus for adjusting load applied by a suspension to a flying-type head slider.

2. Description of the Related Art

A flying-type thin-film magnetic head used for a magnetic disk drive and so on is generally made up of a slider and a magnetic head element provided at the trailing edge of the slider. The slider generally comprises a rail whose surface functions as a medium facing surface (an air bearing surface) and a tapered section or a step near the end on the air inflow side. When a recording medium is rotating, an airflow comes in from the tapered section or the step and passes between the recording medium and the slider. A lift is thus created and exerted on the slider. The slider flies above the surface of the recording medium by means of the lift.

The slider is flexibly supported by a suspension as a supporting device. The suspension generally incorporates: a plate-spring-shaped load beam made of stainless steel, for example; a flexure to which the slider is joined, the flexure being provided at an end of the load beam and giving an appropriate degree of freedom to the slider; and an attachment provided on the other end of the load beam and attached to an actuator that moves the slider across the track of the recording medium.

The suspension applies a load to the slider in the direction toward the surface of a recording medium while the slider is flying. Where a balance is maintained between the load applied by the suspension and the lift generated by the airflow passing between the recording medium and the rail of the slider, a narrow interval is kept between the medium facing surface of the slider and the recording medium while the slider is flying above the surface of the recording medium. The interval between the medium facing surface of the slider and the surface of the recording medium provided while the slider is flying is hereinafter called a flying height of a slider. The flying height of a slider has a great influence on performance of a magnetic head.

With a recent trend of magnetic heads toward smaller size and higher density, there have been intensifying demands for reduction and stability in the flying height of a slider. It is now difficult, however, to meet such demands merely by improving the shapes of the suspension and the medium facing surface of a slider, or merely by forming them with precision.

The flying height of a slider varies depending on the load applied to the slider by the suspension while the slider is flying. Therefore, to ensure stability and accuracy of the flying height of a slider as designed, it is significant that the load applied to the slider by the suspension while the slider is flying falls within a specified range. The load applied to the slider by the suspension while the slider is flying, which is sometimes called a gram load, is hereinafter referred to as a load under flying. It is difficult to make a direct measurement of a load under flying. Therefore, in practice, a suspension is deformed to attain the same state as that where the slider is flying at a specific flying height. Then, in this state, the load applied by the suspension to the slider is measured and the load thus measured is regarded as the load under flying. Such a load applied in this way to the slider under conditions equivalent to those where the slider is flying is hereinafter also referred to as a load under flying.

Where a suspension has just been manufactured, a load under flying supplied by the suspension may not always fall within a specified range. In response to this, several methods have been proposed for adjusting a load under flying supplied by a suspension. Three typical methods are described below.

A first method is to mechanically apply a force to the suspension to bend it, thereby adjusting the load.

A second method is to apply heat to the load beam of the suspension while applying an external force to the suspension, as disclosed in, for example, Published Unexamined Japanese Patent Applications (KOKAI) Heisei 5-159501 (1993), Heisei 5-189906 (1993) and Heisei 10-269538 (1998). In the method, heat is applied to the load beam while generating a stress in the load beam, thereby relieving the stress and thus reducing the load under flying supplied by the suspension. In this method, irradiation with laser light is generally employed as a method for applying heat to the load beam.

A third method, as disclosed in Published Unexamined Japanese Patent Application (KOKAI) Heisei 9-288874 (1997), for example, uses load adjusting fillets (strip-shaped portions) provided in a spring region of the load beam of the suspension. In this method, the load under flying is reduced by relieving stress in the spring region by irradiating the region with laser light, or by cutting one or a plurality of the fillets by irradiating the fillet(s) with laser light. On the other hand, the load is increased by contracting one or a plurality of the fillets by irradiating the fillet(s) with laser light.

However, it is difficult to achieve precise load adjustment with the first method. Furthermore, the first method may cause a curvature of the suspension that is different from what has been designed, which may adversely affect the properties of the suspension.

The second method has a problem in that the load cannot be increased for adjustment. Furthermore, since the second method applies heat to the load beam while applying an external force to the suspension, it involves complicated devices and steps for adjusting the load.

The third method also has a problem in that it makes a structure of the suspension complicated because of the fillets to be provided therein.

OBJECT AND SUMMARY OF THE INVENTION

It is an object of the invention to provide a method and apparatus for adjusting a load applied to a flying-type head slider by a suspension, capable of both increasing and decreasing the load easily.

A method of the invention is provided for adjusting a load applied to a flying-type head slider by a suspension that supports the slider, the load being applied under conditions equivalent to those where the slider is flying. The method includes the steps of: holding the suspension while no external force to bend the suspension is applied to the suspension; and applying heat energy to the suspension to increase or decrease the load.

In the method of the invention, the load is adjusted by applying heat energy to the suspension while no external force to bend the suspension is applied to the suspension.

In the method of the invention, the suspension may be irradiated with laser light in the step of applying heat energy.

In this case, gas for preventing oxidization of the suspension resulting from the irradiation with laser light may be sprayed on a spot on the suspension to be irradiated with the laser light.

In the method of the invention, the suspension may include a load beam for generating the load, the load beam being shaped like a plate spring and having two surfaces that face toward opposite directions, and, one of the two surfaces of the load beam may be selectively irradiated with the laser light in the step of applying heat energy.

The method may further include, before the step of applying heat energy, a step of measuring a parameter indicating an attitude of the suspension which is correlated with the load. Further, in the step of applying heat energy, conditions under which heat energy is applied to the suspension may be controlled based on the measured parameter.

The method of the invention may further include a step of measuring the load and determining whether the load is within a specified range, before and after the step of applying heat energy.

An apparatus of the invention is provided for adjusting a load applied to a flying-type head slider by a suspension that supports the slider, the load being applied under conditions equivalent to those where the slider is flying. The apparatus comprises: a holder (holding means) for holding the suspension while no external force to bend the suspension is applied to the suspension; and a heat energy applying device (means) for applying heat energy to the suspension to increase or decrease the load.

According to the apparatus of the invention, the load is adjusted by applying heat energy to the suspension while no external force to bend the suspension is applied to the suspension.

In the apparatus of the invention, the heat energy applying device (means) may have a laser light irradiating device for irradiating the suspension with laser light. In this case, the apparatus may further comprise a gas injecting device (means) for spraying gas for preventing oxidization of the suspension resulting from the irradiation with laser light on a spot on the suspension to be irradiated with the laser light.

In the apparatus of the invention, the suspension may include a load beam for generating the load, the load beam being shaped like a plate spring and having two surfaces that face toward opposite directions, and the laser light irradiating device may irradiate one of the two surfaces of the load beam selectively with the laser light.

The apparatus of the invention may further comprise: a position measuring instrument (attitude measuring means) for measuring a parameter indicating an attitude of the suspension which is correlated with the load; and a controlling device (means) for controlling conditions under which heat energy is applied to the suspension, based on the parameter measured by the position measuring instrument (attitude measuring means).

The apparatus of the invention may further comprise a load measuring instrument (means) for measuring the load.

Other and further objects, features and advantages of the invention will appear more fully from the following description.

DETAILED DESCRIPTION OF THE PREFERRED EMBODIMENT

An embodiment of the invention will now be described in detail with reference to the accompanying drawings.

Figure 4:
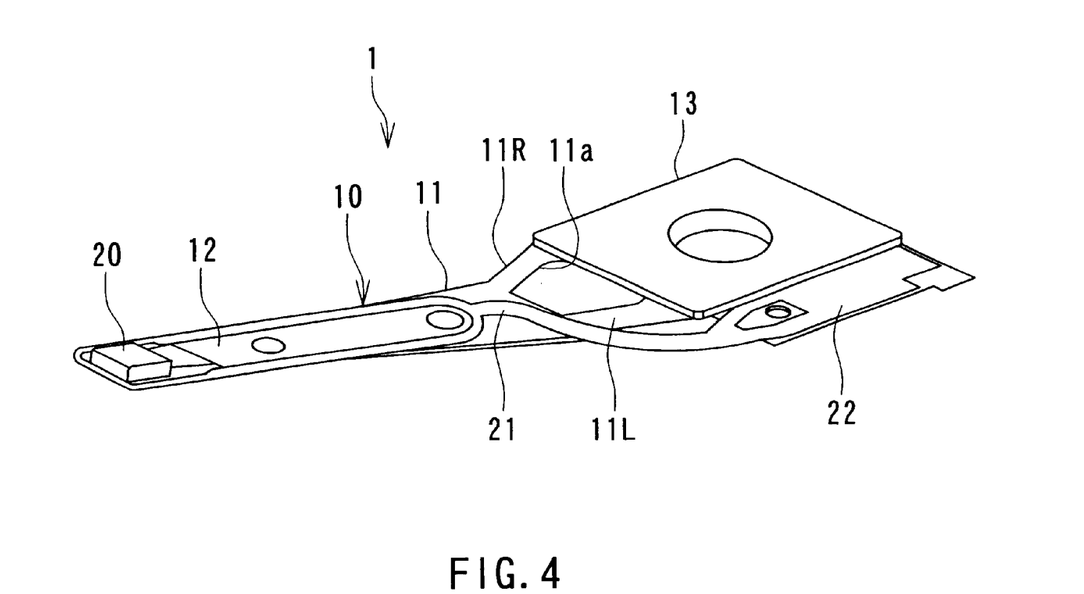
FIG. 4 is a perspective view illustrating an example of a suspension.

An example of a configuration of a suspension to which a load adjusting method and a load adjusting apparatus of an embodiment of the invention is applied will now be described with reference to FIG. 4. FIG. 4 illustrates an example of a head gimbal assembly formed by attaching a slider for a flying-type magnetic head and wiring to a suspension.

A suspension 10 shown in FIG. 4 comprises: a plate-spring-shaped load beam 11 made of stainless steel, for example; a flexure 12 to which a slider 20 for a flying-type magnetic head is joined, the flexure 12 being provided at an end of the load beam 11 and giving an appropriate degree of freedom to the slider 20; and a base plate 13 provided on the other end of the load beam 11 and serving as an attachment to be attached to an actuator that moves the slider 20 across the track of the recording medium.

The load beam 11 has two surfaces that face toward opposite directions. In the following description, of the two surfaces of the load beam 11, one on which the slider 20 is placed is referred to as the front face while the other one as the rear face.

The load beam 11 has a hole 11a formed in a region adjacent to the base plate 13, and bent sections 11L and 11R on both sides of the hole 11a. The symbol 11L refers to the bent section on the left and the symbol 11R refers to the bent section on the right as they are viewed in the direction from the base-plate-13 side to the flexure-12 side. The bent sections 11L and 11R are bent such that the load beam 11 applies a load to the slider 20 in the direction toward the surface of the recording medium.

A gimbal section that maintains the attitude of the slider 20 is provided in the portion of the flexure 12 on which the slider 20 is mounted.

In addition to the suspension 10 having the foregoing components, the head gimbal assembly 1 shown in FIG. 4 also comprises: the slider 20 mounted on the gimbal section of the flexure 12; a wiring 21 provided along the length of the suspension 10 and joined to the suspension 10; and an intermediate terminal component 22 joined to the load beam 11 at a side of the base plate 13.

The slider 20 has a rail whose surface functions as a medium facing surface (an air bearing surface) and a tapered section or a step near the end on the air inflow side. When the recording medium is rotating, an airflow comes in from the tapered section or the step and passes between the recording medium and the slider 20. A lift is thus created and exerted on the slider. The slider 20 flies over the surface of the recording medium by means of the lift. The slider 20 also has a thin-film magnetic head element formed near the end of the air outflow side.

One end of the wiring 21 is connected to the thin-film magnetic head element in the slider 20; the other end of the wiring 21 is connected to the intermediate terminal component 22.

The head gimbal assembly 1 shown in FIG. 4 is attached to an arm of an actuator. An assembled body constituted by an arm and the head gimbal assembly 1 attached to the arm is called a head arm assembly. An assembled body constituted by a carriage with a plurality of arms and a plurality of head gimbal assemblies 1 each attached to the arms is called a head stack assembly.

Figure 5:
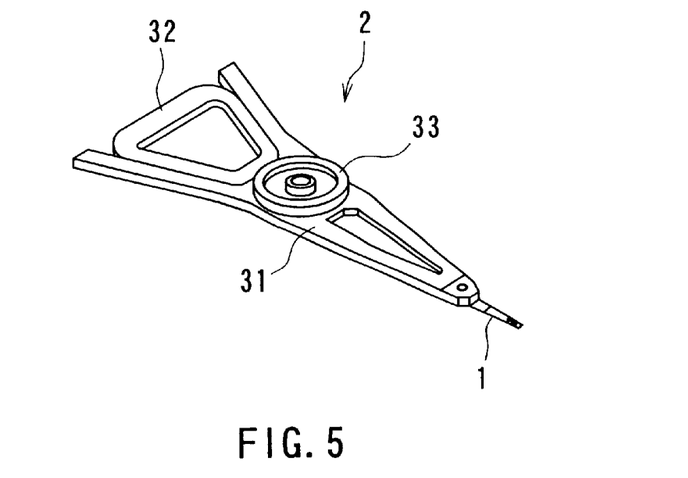
FIG. 5 is a perspective view illustrating an example of a head arm assembly.

FIG. 5 illustrates an example of a head arm assembly. The head arm assembly 2 has an arm 31. The head gimbal assembly 1 is attached to an end of the arm 31. A coil 32 that is part of a voice coil motor of the actuator is attached to the other end of the arm 31. A bearing 33 is provided in the middle of the arm 31. The bearing 33 is attached to a shaft that rotatably supports the arm 31.

Figure 6:
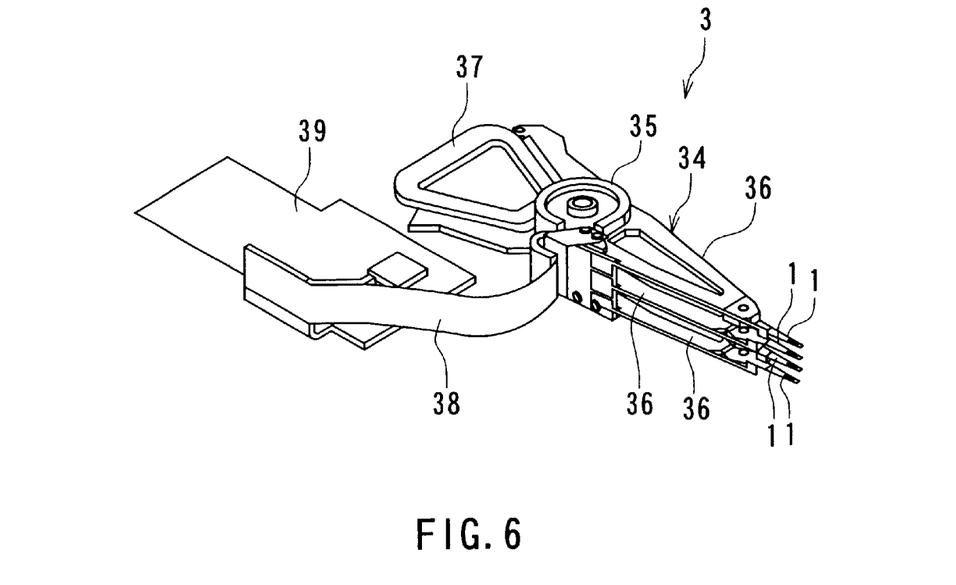
FIG. 6 is a perspective view illustrating an example of a head stack assembly.

FIG. 6 illustrates an example of a head stack assembly. The head stack assembly 3 incorporates a carriage 34. The carriage 34 has a bearing 35 attached to a shaft that rotatably supports the carriage 34, and a plurality of arms 36 attached to the bearing 35 and arranged in parallel with one another. In the example shown in FIG. 6, there are three arms 36. One head gimbal assembly 1 is attached to the tip of each of the arms 36 at the top and bottom stages, while two head gimbal assemblies 1 are attached to the tip of the arm 36 at the middle stage. A coil 37 that is part of the voice coil motor of the actuator is attached to the bearing 35 on a side opposite to the arms 36. The head stack assembly 3 further incorporates a flat cable 38 one end of which is connected to the intermediate terminal component 22 of the head gimbal assembly 1, and a circuit board 39 connected to the other end of the flat cable 38.

Figure 1:
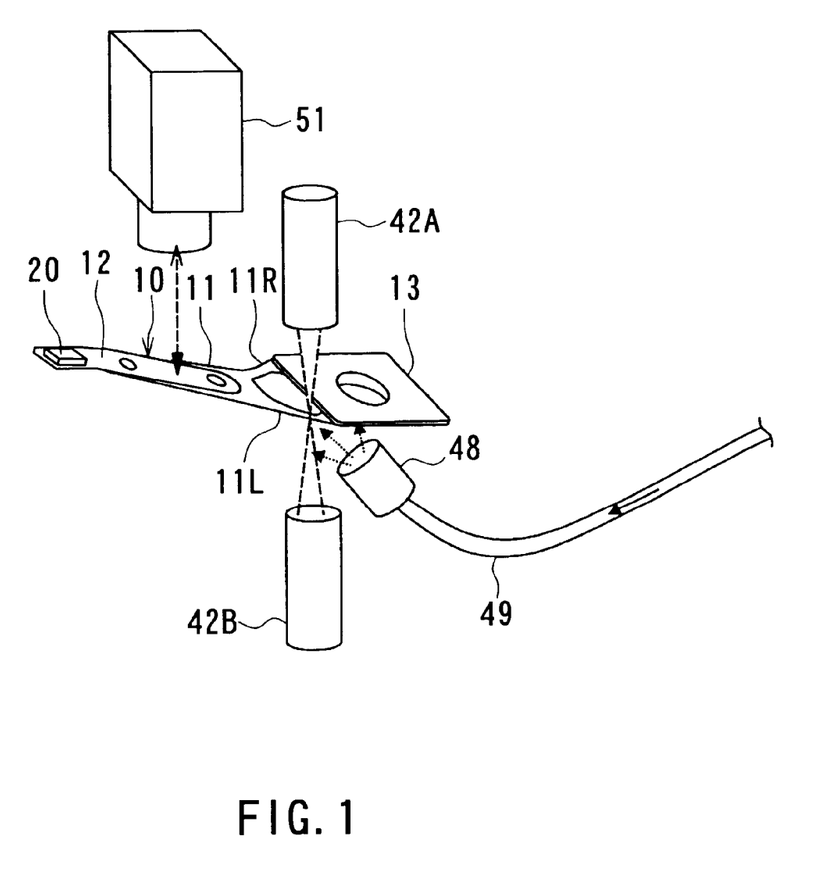
FIG. 1 is a perspective view illustrating the main part of a load adjusting apparatus according to an embodiment of the invention.
Figure 2:
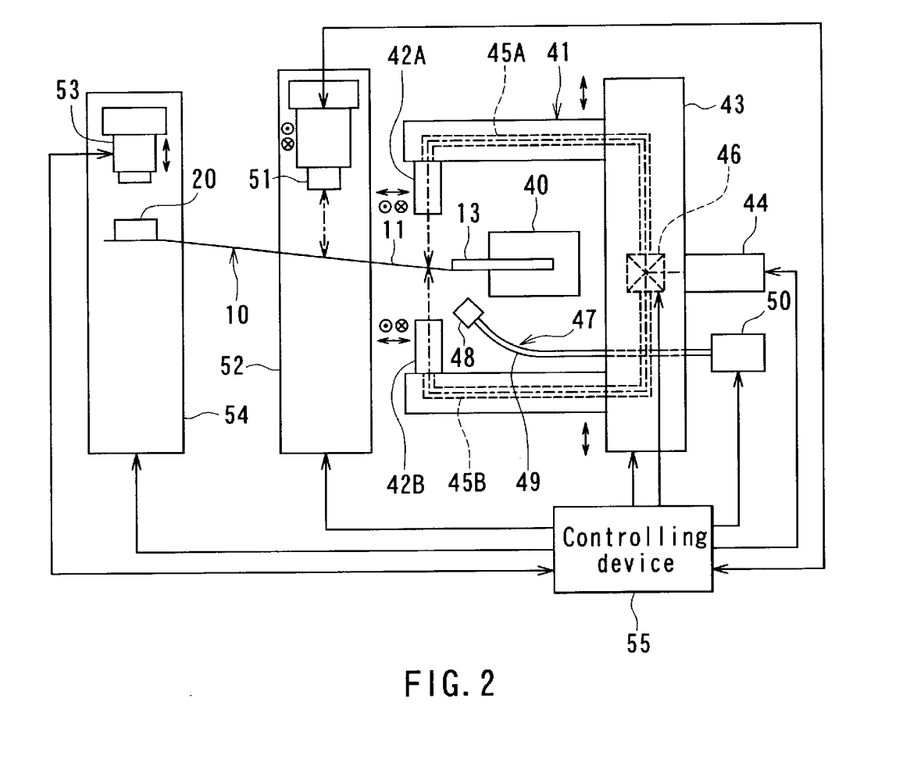
FIG. 2 is an explanatory view illustrating an overall configuration of the load adjusting apparatus of the embodiment of the invention.

A configuration of the load adjusting apparatus according to the embodiment will now be described with reference to FIG. 1 and FIG. 2. FIG. 1 is a perspective view illustrating the main part of the load adjusting apparatus. FIG. 2 is an explanatory view illustrating an overall configuration of the load adjusting apparatus. The load adjusting apparatus adjusts a load that the suspension 10 applies to the slider 20 under conditions equivalent to those where the slider 20 is flying or, in other words, a load under flying in the present application. The load adjusting apparatus of the embodiment also performs a process of adjusting the load under flying on the suspension 10 in the state of the head gimbal assembly 1.

The load adjusting apparatus has a holder 40 for holding the suspension 10 with no external force to bend the suspension 10 applied to the suspension 10. The holder 40 holds the suspension 10 by pinching the base plate 13 of the suspension 10. As held by the holder 40, the suspension 10 is disposed such that the front face of the load beam 11 faces upward and the rear face of the load beam 11 faces downward. The holder 40 corresponds to the holding means of the invention.

The load adjusting apparatus further incorporates a laser light irradiating device 41 for applying heat energy to the suspension 10 by irradiating the suspension 10 with laser light, so as to increase or decrease the load under flying. The laser light irradiating device 41 has: a laser irradiating section 42A that faces the front face of the load beam 11 and irradiates the front face with laser light; a laser irradiating section 42B that faces the rear face of the load beam 11 and irradiates the rear face with laser light; and a driving device 43 that moves each of the laser irradiating sections 42A and 42B independently in the vertical and horizontal directions in FIG. 2 and in the direction orthogonal to the surface of the drawing sheet of FIG. 2. The laser light irradiating device 41 further has: a laser light source 44 to emit laser light; light guides 45A and 45B, such as optical fibers, for guiding the laser light emitted from the laser light source 44 to the laser irradiating sections 42A and 42B; and a light switch 46 for supplying the laser light emitted from the laser light source 44 to one of the light guides 45A and 45B. For example, a YAG laser is used as the laser light source 44. The laser irradiating sections 42A and 42B each include an optical system for collecting the laser light such that the light converges to a minimum diameter near the load beam 11. The laser light irradiating device 41 corresponds to the heat energy applying means or the heat energy applying device of the invention.

The load adjusting apparatus further incorporates a gas injecting device 47 as gas injecting means for spraying gas for preventing oxidization of the suspension 10 resulting from the laser light irradiation onto a spot to be irradiated with the laser light on the suspension 10. The gas injecting device 47 has: a gas injecting nozzle 48 from which nitrogen gas for preventing oxidization of the suspension 10 is injected onto the spot to be irradiated with the laser light on the suspension 10; a gas supply pipe 49 an end of which is connected to the gas injecting nozzle 48; and a gas supply source 50, connected to the other end of the gas supply pipe 49, for supplying the nitrogen gas to the gas injecting nozzle 48 via the gas supply pipe 49.

The load adjusting apparatus further incorporates: a position measuring instrument 51 for measuring the position of a specific spot on the load beam 11 in the vertical direction, the position serving as a parameter indicating an attitude of the suspension 10 which is correlated with the load under flying supplied by the suspension 10; and a driving device 52 for moving the position measuring instrument 51 at least in the direction orthogonal to the surface of the drawing sheet of FIG. 2. For example, an optical height sensor may be used as the position measuring instrument 51. The position measuring instrument 51 corresponds to the attitude measuring means of the invention.

Based on information on the position of the load beam 11 measured by the position measuring instrument 51, it is possible to determine the angle formed by the length of a part of the load beam 11, the part located on the side of the slider 20 relative to the bent sections 11L and 11R, with respect to the horizontal plane (the angle is hereinafter called a pitch angle), by calculation. Moreover, by measuring positions of a plurality of spots on the load beam 11 while moving the position measuring instrument 51 in the direction orthogonal to the surface of the drawing sheet using the driving device 52, it is possible to determine the angle that the direction parallel to the surface of the load beam 11 and orthogonal to the length of the load beam 11 forms with respect to the horizontal plane (the angle is hereinafter called a roll angle) by calculation. The pitch angle and the roll angle also serve as parameters indicating an attitude of the suspension 10.

The load adjusting apparatus further incorporates a load measuring instrument 53 for measuring the load under flying supplied by the suspension 10, and a driving device 54 for moving the load measuring instrument 53 in the vertical direction. For example, a load cell may be used as the load measuring instrument 53. When measuring the position of the load beam 11 or when irradiating the load beam 11 with laser light, the load measuring instrument 53 is placed above the slider 20 without contacting the slider 20. On the other hand, when measuring the load under flying supplied by the suspension 10, the load measuring instrument 53 is moved down by the driving device 54 to a position where the instrument 53 comes into contact with the slider 20 to push the slider down, so as to make the state of the slider 20 equivalent to a state where it is flying. Then, in this state, the load measuring instrument 53 measures the load under flying supplied by the suspension 10.

The load adjusting apparatus further incorporates a controlling device 55 for controlling the driving device 43, the laser light source 44, the light switch 46, the gas supply source 50, the position measuring instrument 51, the driving device 52, the load measuring instrument 53 and the driving device 54, and for receiving measurement data of each of the position measuring instrument 51 and the load measuring instrument 53. The controlling device 55 is made up of a computer, for example. The controlling device 55 controls the conditions under which the suspension 10 is irradiated with laser light, based on the measurement data of the position measuring instrument 51. The controlling device 55 corresponds to the controlling means of the invention.

Figure 3:
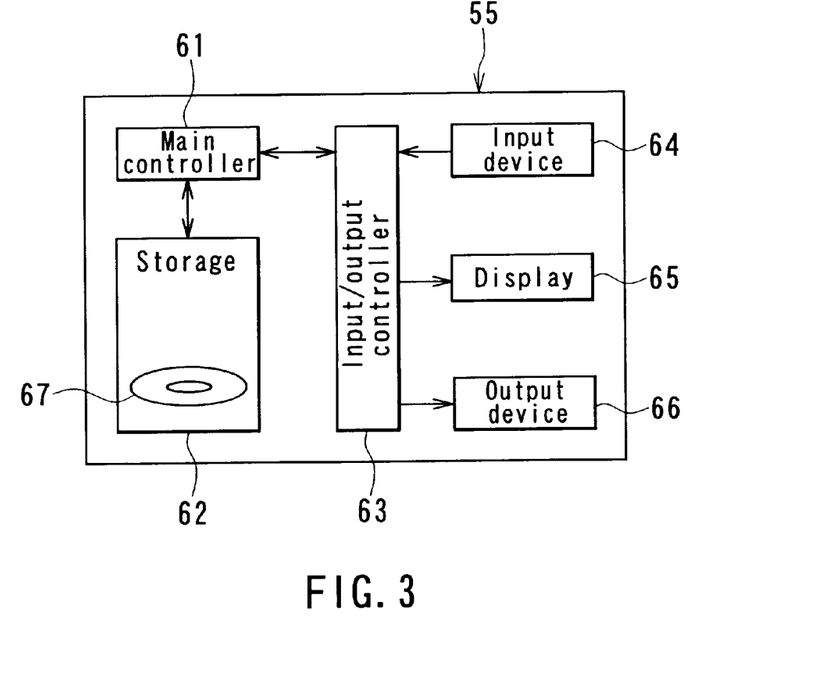
FIG. 3 is a block diagram illustrating an example of a configuration of a controlling device in FIG. 2.

FIG. 3 is a block diagram of an example of the controlling device 55. The controlling device 55 in this example comprises: a main controller 61; a storage 62 connected to the main controller 61; an input/output controller 63 connected to the main controller 61; an input device 64; a display 65; and an output device 66. The input device 64, the display 65 and the output device 66 are connected to the input/output controller 63. The main controller 61 incorporates a central processing unit (CPU), a read only memory (ROM) and a random access memory (RAM). The storage 62 may be of any form as long as it is capable of retaining information, such as a hard disk device, an optical disk device, or a floppy disk device. The storage 62 allows information to be recorded on a recording medium 67 and to be reproduced from the recording medium 67. The recording medium 67 may be of any form as long as it is capable of retaining information, such as a hard disk platter, an optical disk, or a floppy disk.

The CPU in the main controller 61 implements the function as the controlling device 55 by executing programs stored on the medium 67 or in the ROM in the main controller 61, using the RAM in the main controller 61 as a work area.

A load adjusting method according to the embodiment using the apparatus as above will now be described. In the method, a process of adjusting the load under flying is performed on the suspension 10 in the state of the head gimbal assembly 1.

Figure 7:
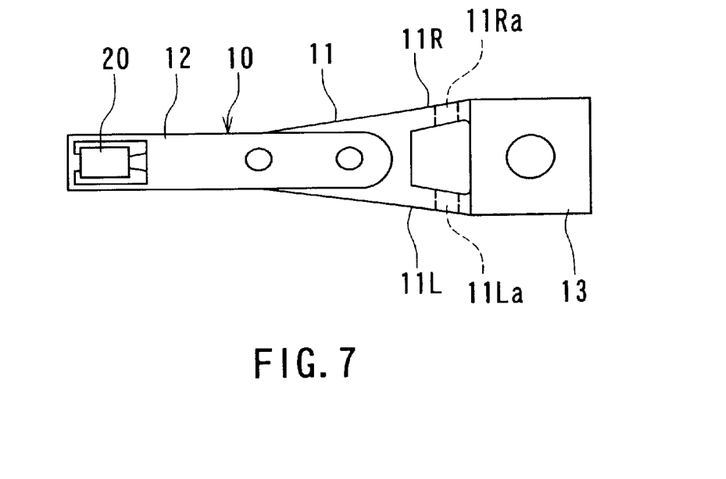
FIG. 7 is a plan view illustrating a suspension in a state of a head gimbal assembly.

FIG. 7 is a plan view illustrating the suspension 10 in the state of the head gimbal assembly 1. However, illustrations of the wiring 21 and the intermediate terminal component 22 are omitted in FIG. 7. In the present embodiment, as shown in FIG. 7, the bent sections 11L and 11R of the load beam 11 have laser light irradiation regions 11La and 11Ra, respectively, which are regions to receive irradiation with laser light for adjustment of the load under flying. In the present embodiment, either the front face or the rear face of the load beam 11 is selectively irradiated with laser light in the regions 11La and 11Ra.

Figure 8:
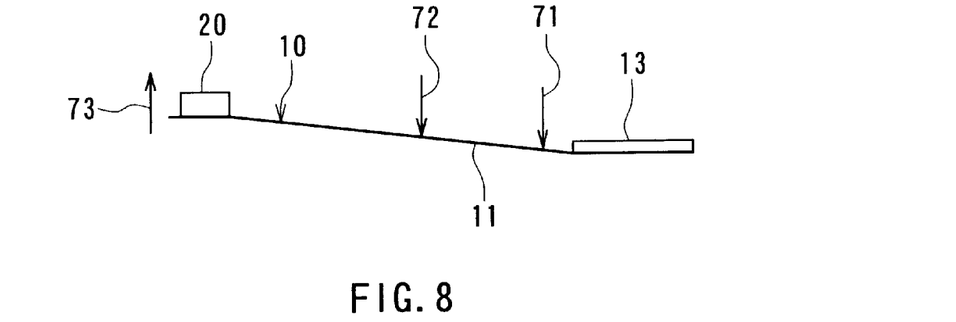
FIG. 8 is an explanatory view illustrating a load adjusting method according to an embodiment of the invention.

To increase the load under flying, as shown in FIG. 8, the front face of the load beam 11 is irradiated with laser light in the regions 11La and 11Ra. In FIG. 8, the arrow indicated with numeral 71 represents a spot to be irradiated with the laser light and the direction of the irradiation, whereas the arrow indicated with numeral 72 represents a spot on which light for measurement is incident from the position measuring instrument 51, and the direction of incidence of the light.

In the present embodiment, the laser light has an intensity great enough to generate a local plastic deformation of the load beam 11. In this case, a local thermal stress is generated in the portion of the load beam 11 that has been irradiated with the laser light. When the thermal stress exceeds the yield point of the material of the load beam 11, a contracting plastic deformation occurs in the portion irradiated with the laser light.

When the front face of the load beam 11 has been irradiated with the laser light, a contracting plastic deformation occurs near the front face. Therefore, part of the load beam 11 on the side of the slider 20 is displaced in the direction indicated with numeral 73, to increase the pitch angle and to thereby increase the load under flying supplied by the suspension 10.

Figure 9:
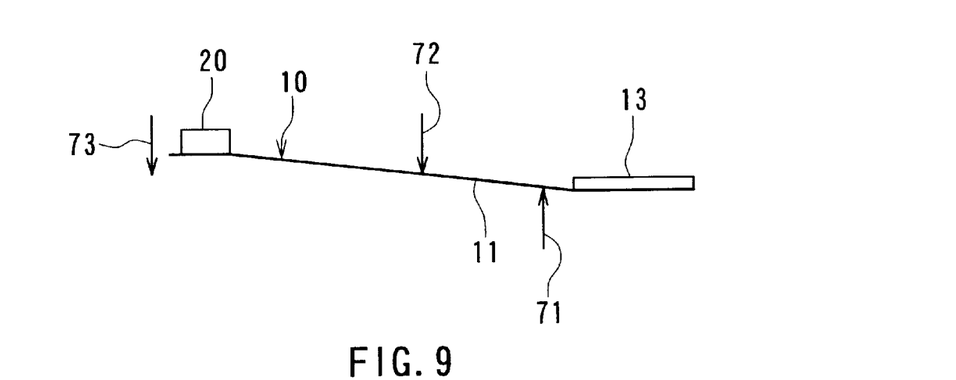
FIG. 9 is an explanatory view illustrating a load adjusting method according to the embodiment of the invention.

In contrast, to decrease the load under flying, the rear face of the load beam 11 is irradiated with laser light in the regions 11La and 11Ra, as shown in FIG. 9. In FIG. 9, the arrow indicated with the numeral 71 represents a spot to be irradiated with the laser light and the direction of the irradiation, whereas the arrow indicated with numeral 72 represents a spot on which light for measurement is incident from the position measuring instrument 51, and the direction of incidence of the light. When the rear face of the load beam 11 has been irradiated with the laser light, a contracting plastic deformation occurs near the rear face. Therefore, the part of the load beam 11 on the side of the slider 20 is displaced in the direction indicated with numeral 73, to decrease the pitch angle and to thereby decrease the load under flying supplied by the suspension 10.

Figure 11:
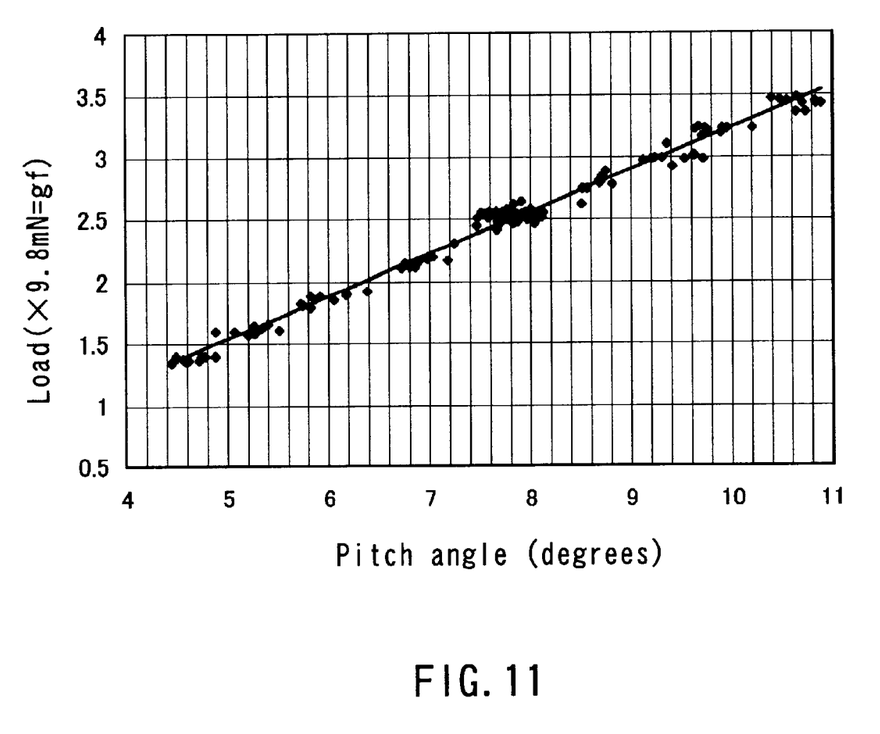
FIG. 11 is a plot showing a relationship between a pitch angle of a load beam and a load under flying.

It should be noted, as shown in FIG. 11, that there is a correlation between the pitch angle and the load under flying. FIG. 11 illustrates the results of an experiment performed to study the relationship between the pitch angle and the load under flying. In the experiment, the laser light was projected on either the front face or the rear face of the load beam 11 in the above-described manner to thereby change the pitch angle, and the load under flying obtained at each of the different pitch angles was measured. FIG. 11 shows that there is a strong correlation between the pitch angle and the load under flying. Therefore, it would be useful to prepare data on the correlation between the pitch angle and the load under flying (hereinafter called the pitch angle/load correlation data) in a format such as an equation or a table in advance. Then, it is possible to know the load under flying from the pitch angle/load correlation data and the pitch angle determined by measurement. From the pitch angle/load correlation data and the pitch angle determined by measurement, it is also possible to determine an amount of correction of the pitch angle required for attaining a desired value of the load under flying. In the present embodiment, the amount of correction of the pitch angle required is determined from the pitch angle/load correlation data and the pitch angle determined by measurement, and then the conditions for the laser light irradiation is controlled based on the amount of correction of the pitch angle thus determined.

An amount of change in the pitch angle and that in the load under flying resulting from the laser light irradiation can be changed by changing the conditions for the laser light irradiation. The conditions for the laser light irradiation include intensity of the laser light, diameter of the laser light on the load beam 11, irradiation duration, position of a spot to be irradiated, the number of the spots and the interval between the spots. Here, as an example, the irradiation is performed on the load beam 11 once, or several times by changing the spots to be irradiated, with fixed intensity and diameter of the laser light, and fixed irradiation duration at a time. Then the amount of change in the pitch angle and that in the load under flying are controlled through controlling the number of the spots to be irradiated.

Figure 10:
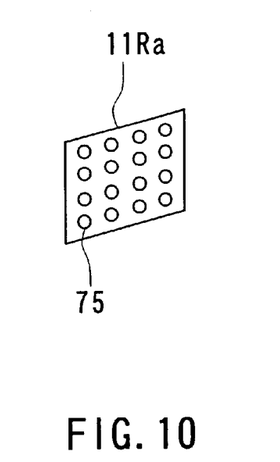
FIG. 10 is an explanatory view illustrating an example of arrangement of spots to be irradiated with laser light in a laser light irradiation region in FIG. 7.

FIG. 10 illustrates an example of arrangement of spots 75 to be irradiated with laser light in the irradiation region 11Ra. The laser light is projected onto those spots 75. The same applies to the irradiation region 11La.

Figure 12:
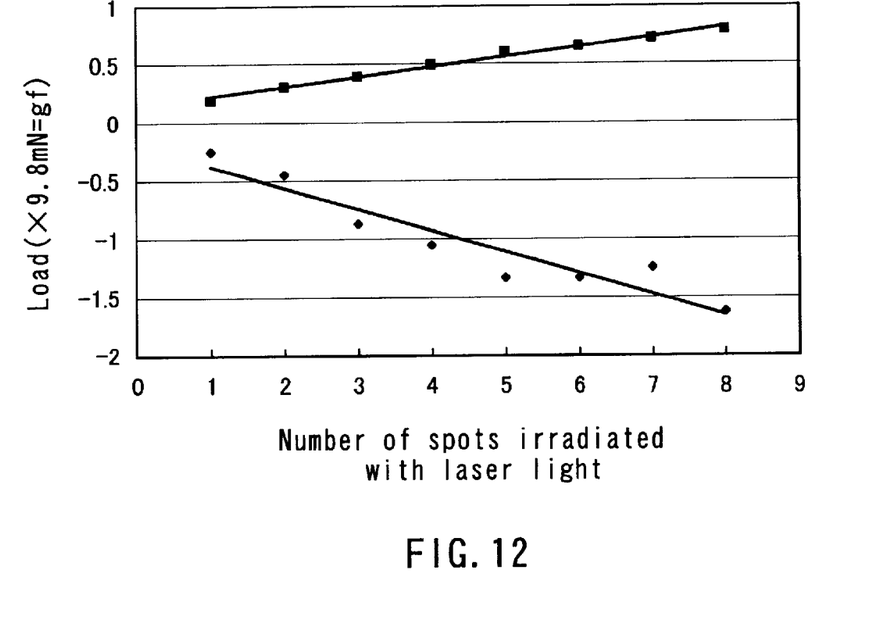
FIG. 12 is a plot showing a relationship between the number of spots in the load beam irradiated with laser light and the load under flying.

FIG. 12 shows the results of an experiment performed to study the relationship between the number of spots irradiated with laser light and the load under flying. In FIG. 12, dots in the area in which the values of the load under flying are positive represent the results of the laser irradiation on the front face of the load beam 11, while dots in the area in which the values of the load under flying are negative represent the results of the laser irradiation on the rear face of the load beam 11. FIG. 12 shows that there is a correlation between the number of spots irradiated and the amount of change in the load under flying. It means that the amount of change in the load under flying and the amount of change in the pitch angle corresponding thereto can be controlled by controlling the number of spots to be irradiated.

Figure 13:
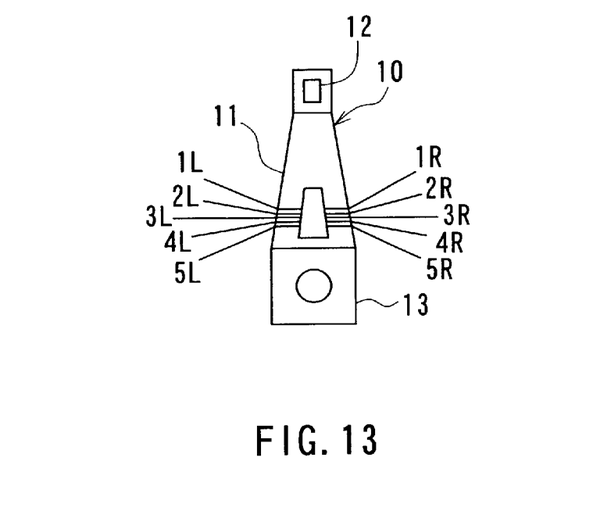
FIG. 13 is an explanatory view illustrating a method of correcting a roll angle of the load beam in the embodiment of the invention.

According to the embodiment, it is also possible to correct the roll angle by making the conditions for the laser light irradiation on the load beam 11 different between the irradiation regions 11La and 11Ra. An experiment was performed to confirm that the roll angle is correctable in the above-mentioned manner, and the results are now described. In the experiment, as shown in FIG. 13, spots 1L to 5L and 1R to 5R to be irradiated with the laser light were set in the irradiation regions 11La and 11Ra respectively. Then, a fixed intensity of laser light was projected onto those spots in a single load beam 11 in the order of 1L, 1R, 2L, 2R, . . . , 5L and 5R, and, the initial roll angle and a roll angle after the laser light irradiation on each of the spots were measured to calculate the amount of change in the roll angle due to the laser irradiation on each of the spots. In the measurement, the roll angle was expressed in positive values when the left-hand side of the load beam 11 was higher than its right-hand side, while expressed in negative values in the reverse situation.

Figure 14:
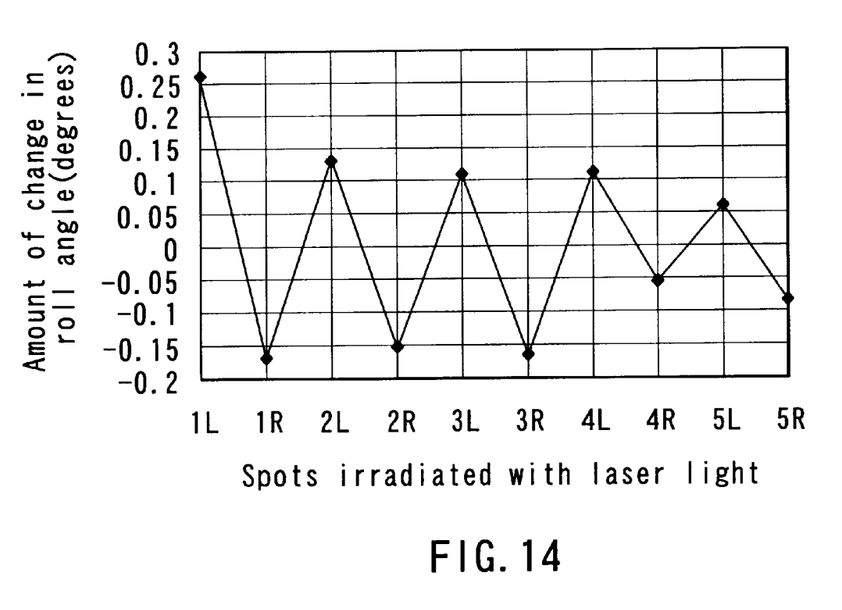
FIG. 14 is a plot showing a relationship between the spots irradiated with laser light and an amount of change in the roll angle.

In the experiment, the laser irradiation and measurement of the roll angles were performed for nine load beams 11, to determine the average value of amounts of changes in the roll angles resulting from the laser irradiation on the above-mentioned spots. The results are shown in FIG. 14. From this diagram, it is shown that the roll angle can be increased or decreased through laser light irradiation on either the region 11La or 11Ra. The results shown here are those obtained when the regions 11La and 11Ra were alternately irradiated with the laser light, as an example. However, the roll angle is actually correctable by making the conditions for the laser irradiation different between the regions 11La and 11Ra, such as intensity of the laser light, diameter of the laser light, irradiation duration, position of a spot to be irradiated, the number of the spots to be irradiated, interval between the spots and the order of irradiation on the spots.

To correct only the pitch angle (load under flying) when the initial roll angle is within a specified range, it is adequate to irradiate the regions 11La and 11Ra with the laser light under the same conditions.

To correct both the pitch angle (load under flying) and the roll angle when the initial roll angle is not within a specified range, the regions 11La and 11Ra may be irradiated under different conditions so that the pitch angle and the roll angle fall within a specified range.

Figure 15:
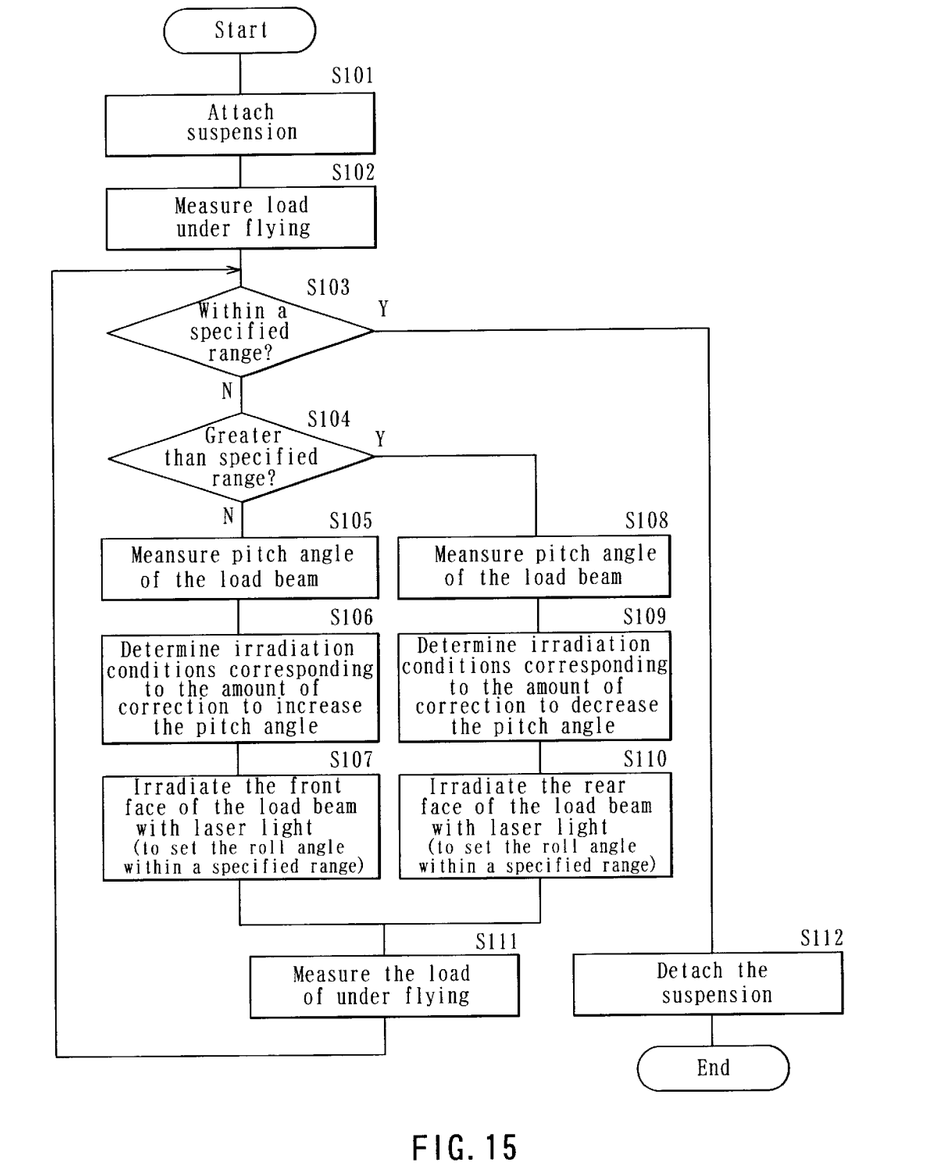
FIG. 15 is a flow chart showing an example of the load adjusting method according to the embodiment of the invention.

Reference is now made to the flow chart of FIG. 15 to describe an example of the embodiment of the load adjusting method of the invention. In the example shown in FIG. 15, the suspension 10 is first attached to the holder 40 (step S101). Then, an initial load under flying supplied by the suspension 10 is measured using the load measuring instrument 53 (step S102). Next, the controlling device 55 determines whether the load under flying is within a specified range (step S103).

If the load under flying is not within a specified range (N), the controlling device 55 determines whether the load under flying is greater than the value within the specified range (step S104). If the load under flying is not greater than the value within the specified range (N), in other words, if it is smaller than the value within the specified range, then the pitch angle of the load beam 11 is measured (step S105). At that time, it is preferable to measure the roll angle of the load beam 11, too. For measuring the pitch angle and the roll angle, the position of the load beam 11 is measured by the position measuring instrument 51, and based on the information on the position, the controlling device 55 determines the pitch angle and the roll angle by calculation. Then, the controlling device 55 determines, from the pitch angle/load correlation data and the pitch angle, an amount of correction of the pitch angle to increase the angle, to thereby determine conditions for the laser irradiation, such as irradiation amount, corresponding to the amount of the correction (step S106). If the roll angle of the load beam 11 has been measured in step S105, the conditions for the laser light irradiation are determined such that the roll angle falls within a specified range. Then, under the conditions thus determined, in the regions 11La and 11Ra the front face of the load beam 11 is irradiated with laser light using the laser light irradiating device 41 to correct the pitch angle of the load beam 11 (step S107). If the roll angle of the load beam 11 has been measured in step S105, the correction of the pitch angle in step S107 is performed such that the roll angle falls within the specified range. When irradiating the load beam 11 with laser light, the gas injecting device 47 sprays nitrogen gas on the spots on the load beam 11 that are to receive the irradiation.

If the load under flying is greater than the value within the specified range (Y) in step S104, then the pitch angle of the load beam is measured (step S108). At that time, it is preferable to measure the roll angle of the load beam 11, too. Then, the controlling device 55 determines, from the pitch angle/load correlation data and the pitch angle, an amount of correction of the pitch angle to decrease the angle, to thereby determine conditions for the laser irradiation, such as irradiation amount, corresponding to the amount of the correction (step S109). If the roll angle of the load beam 11 has been measured in step S108, the conditions for the laser irradiation are determined such that the roll angle falls within a specified range. Then, under the conditions thus determined, in the regions 11La and 11Ra the rear face of the load beam 11 is irradiated with laser light using the laser light irradiating device 41 to correct the pitch angle of the load beam 11 (step S110). If the roll angle of the load beam 11 has been measured in step S108, the correction of the pitch angle in step S110 is performed such that the roll angle falls within the specified range. When irradiating the load beam 11 with laser light, the gas injecting device 47 sprays nitrogen gas on the spots on the load beam 11 that are to receive the irradiation.

After correction of the pitch angle in step S107 or in step S110, the load measuring instrument 53 measures the load under flying supplied by the suspension 10 (step S111). Then, the process returns to step 103 to determine whether the load under flying is within the specified range.

If the load under flying is within the specified range (Y) in step S103, the suspension 10 is detached from the holder 40 (step S112) to terminate the process of load adjustment.

In the example shown in FIG. 15, before and after the step of irradiating the load beam 11 with laser light using the laser irradiating device 41 to thereby apply heat energy (steps S107 and S110), the load under flying supplied by the suspension 10 is measured to determine whether it falls within a specified range. According to the example of the embodiment, it is therefore possible to adjust the load under flying such that it falls within the specified range without fail. If it is known that the initial load under flying is nearly the same for a plurality of suspensions 10 forming one group, measurements of the initial load under flying and the initial pitch angle may be performed for some of the plurality of suspensions 10 in the group to thereby determine the conditions for laser irradiation based on the results thereof. Then, the conditions for irradiation thus determined may be utilized for correction of the load under flying for all of the suspensions 10 in the group.

As shown in FIG. 11, there is a correlation between the pitch angle of the load beam 11 and the load under flying. Therefore, whether the load under flying falls within a specified range can also be determined by measuring the pitch angle of the load beam 11, without measuring the load under flying. An example of the load adjusting method in which adjustment is performed in this way is now described with reference to the flow chart in FIG. 16.

Figure 16:
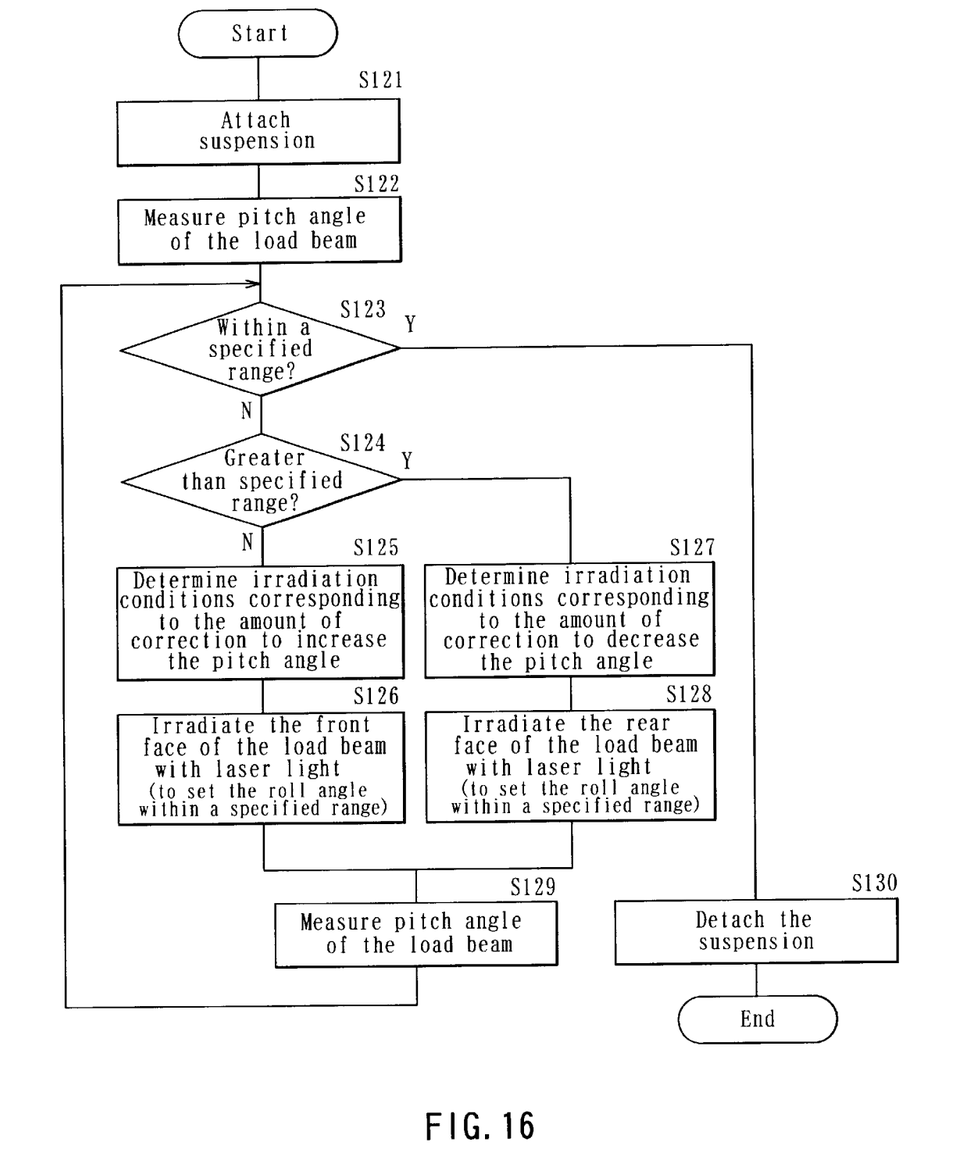
FIG. 16 is a flow chart showing another example of the load adjusting method according to the embodiment of the invention.

In the example shown in FIG. 16, the suspension 10 is first attached to the holder 40 (step S121). Then, the pitch angle of the load beam 11 is measured (step S122). At that time, it is preferable to measure the roll angle of the load beam 11, too. Then, the controlling device 55 determines whether the pitch angle is within a specified range (step S123).

If the pitch angle is not within the specified range (N), the controlling device 55 determines whether the pitch angle is greater than the value within the specified range (step S124). If the pitch angle is not greater than the value within the specified range (N), in other words, if it is smaller than the value within the specified range, the controlling device 55 determines, from the pitch angle/load correlation data and the pitch angle, an amount of correction of the pitch angle to increase the angle, to thereby determine conditions for the laser irradiation, such as irradiation amount, corresponding to the amount of the correction (step S125). If the roll angle of the load beam 11 has been measured in step S122, the conditions for the laser irradiation are determined such that the roll angle falls within a specified range. Then, under the conditions thus determined, in the regions 11La and 11Ra the front face of the load beam 11 is irradiated with laser light using the laser light irradiating device 41 to correct the pitch angle of the load beam 11 (step S126). If the roll angle of the load beam 11 has been measured in step S122, the correction of the pitch angle in step S126 is performed such that the roll angle falls within the specified range. When irradiating the load beam 11 with laser light, the gas injecting device 47 sprays nitrogen gas on the spots on the load beam 11 that are to receive the irradiation.

If the pitch angle is greater than the value within the specified range (Y) in step S124, the controlling device 55 determines, from the pitch angle/load correlation data and the pitch angle, an amount of correction of the pitch angle to decrease the angle, to thereby determine conditions for the laser irradiation, such as irradiation amount, corresponding to the amount of the correction (step S127). If the roll angle of the load beam 11 has been measured in step S122, the conditions for the laser irradiation are determined such that the roll angle falls within a specified range. Then, under the conditions thus determined, in the regions 11La and 11Ra the rear face of the load beam 11 is irradiated with laser light using the laser light irradiating device 41 to correct the pitch angle of the load beam 11 (step S128). If the roll angle of the load beam 11 has been measured in step S122, the correction of the pitch angle in step S128 is performed such that the roll angle falls within the specified range. When irradiating the load beam 11 with laser light, the gas injecting device 47 sprays nitrogen gas on the spots on the load beam 11 that are to receive the irradiation.

After correction of the pitch angle in step S126 or in step S128, the pitch angle of the load beam 11 is measured (step S129). Then, the process returns to step 123 to determine whether the pitch angle is within the specified range.

If the pitch angle is within the specified range (Y) in step S123, the suspension 10 is detached from the holder 40 (step S130) to terminate the process of load adjustment.

According to the example shown in FIG. 16, it is not necessary to measure the load under flying supplied by the suspension 10, and it is therefore possible to simplify the process of load adjustment.

In the foregoing, the process of load adjustment has been described in which adjustment of the load under flying is performed on the suspension 10 in the state of the head gimbal assembly 1. However, the load adjusting method and apparatus according to the embodiment may be used for the suspension(s) 10 in any of the following state: a suspension 10 as it is alone; in the state of the head arm assembly 2; and in the state of the head stack assembly 3. For a suspension 10 as it is alone or in state of the head arm assembly 2, the load under flying can be adjusted in the same way as the case where the suspension 10 is in the state of the head gimbal assembly 1. For the head stack assembly 3, in which a plurality of suspensions 10 are stacked, it is difficult to project the laser light in the vertical direction onto the front and rear faces of each of the suspensions 10. In this case, correction of the load under flying is achieved by projecting the laser light in a slanting direction. Measurement of the position of the load beam 11 may be performed from the side of the head stack assembly 3, for example.

As described above, according to the embodiment, heat energy is applied to the suspension 10 while no external force to bend the suspension 10 is applied. This makes it easy to increase or decrease the load under flying supplied by the suspension 10 for adjustment. It is thereby possible to attain a stable and accurate flying height of the slider 20 as designed, which can improve manufacturing yield of apparatuses including flying-type magnetic heads and can respond to a trend toward more strict specifications.

According to the embodiment, the load under flying supplied by the suspension 10 can be adjusted to an any value within the adjustable range. This can readily respond to the need for setting the load under flying to various values in the process of developing new products, and thereby can reduce the time required for development of new products.

According to the embodiment, heat energy is applied to the suspension 10 by irradiation with laser light. Therefore, it is possible to locally apply the heat energy to the suspension 10, and as a result, it is possible to adjust the load under flying with high precision.

According to the embodiment, nitrogen gas for preventing oxidization resulting from the laser light irradiation is sprayed on the spots to be irradiated with laser light on the suspension 10. Discoloration of the suspension 10 following oxidization is thereby prevented.

According to the embodiment, one of the two surfaces of the load beam 11 is selectively irradiated with laser light to adjust the load under flying. This makes it easier to increase and decrease the load under flying for adjustment.

According to the embodiment, a pitch angle of the load beam 11, which serves as a parameter indicating an attitude of the suspension 10 that is correlated with the load under flying, is measured and, based on the pitch angle thus measured, conditions for the laser irradiation on the suspension 10 are controlled. This eliminates the need for measurement of the load under flying and therefore makes it easy to adjust the load.

The load adjusting method and apparatus of the embodiment are applicable for any of the suspension(s) 10 in a state in which it is alone, a state of the head gimbal assembly 1, a state of the head arm assembly 2, and in a state of the head stack assembly 3. Therefore, the method and the apparatus of the embodiment are also utilizable in the manufacturing process of any of the above products.

In the embodiment described above, the load under flying is adjusted by causing a local plastic deformation on the load beam 11 by irradiation with laser light. However, it is also possible to apply to the load beam 11 such heat energy as will relieve a stress in the load beam 11, and to thereby decrease the load under flying. One of conceivable methods for applying to the load beam 11 such heat energy as will relieve the stress is irradiating the load beam 11 with laser light whose intensity is smaller than such an intensity as will cause plastic deformation on the load beam 11. When using this method, it is preferable to irradiate the load beam 11 broadly, rather than locally.

Figure 17:
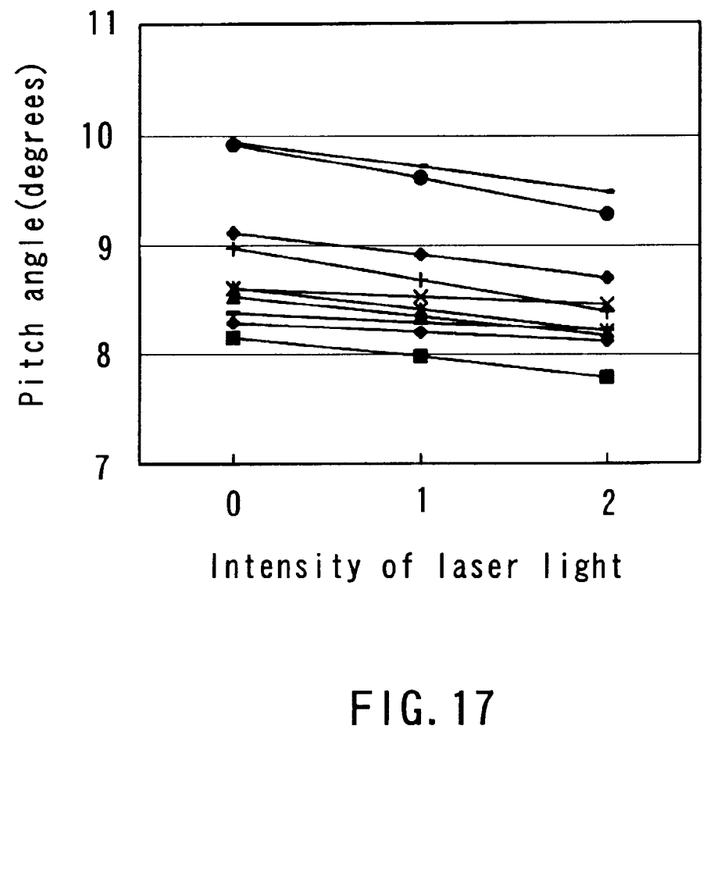
FIG. 17 is a plot showing a relationship between a change in the pitch angle of the load beam and the laser light intensity within such a range as will cause a relief of stress.

FIG. 17 shows the results of an experiment performed to study the relationship between the intensity of laser light and changes in the pitch angle of the load beam 11. The intensity of laser light is within such a range as will cause relief of stress in the load beam 11. In the experiment, ten load beams 11 were irradiated with laser light while changing the intensity of the laser light within the above-described range, to observe changes in the pitch angles before and after the irradiation. In FIG. 17, while the laser light intensity may be in any unit, the intensity increases as it approaches the right end. Also in FIG. 17, the value of zero in the laser light intensity represents the state before the irradiation. From FIG. 17, it is shown that the load under flying supplied by the suspension 10 can be decreased by irradiating the load beam 11 with laser light having such an intensity as will cause relief of stress in the load beam 11, and that an amount of change in the load under flying becomes greater as the intensity of the laser light increases. Thus, the amount of change in the load under flying is controllable by controlling the intensity of the laser light. It is also possible to control the amount of change in the load under flying by controlling other conditions for the laser light irradiation, such as duration of irradiation, instead of the intensity of laser light.

The present invention is not limited to the foregoing embodiment but may be practiced in still other ways. For example, in the present invention, load adjustment through plastic deformation and that through relief of stress may be employed in combination. To do so, one of the surfaces of the load beam is irradiated with laser light while changing conditions for the laser light irradiation, such as intensity of the laser light. This makes it possible to both increase and decrease the load under flying for adjustment.

The present invention may be applied not only to a suspension that holds a slider for a magnetic head but also to a suspension that holds a slider for a different type of head, such as an optical recording head or an magneto-optical recording head.

As described in the foregoing, in the load adjusting method or apparatus of the invention, heat energy is applied to the suspension while no external force to bend the suspension is applied to the suspension. Therefore, the method or apparatus of the invention makes it possible to easily increase or decrease the load applied by the suspension for adjustment.

In the load adjusting method or apparatus of the invention, application of heat energy to the suspension may be performed through irradiating the suspension with laser light. In this case, it is possible to locally apply heat energy to the suspension, and as a result, it is possible to perform load adjustment with high precision.

In the load adjusting method or apparatus of the invention, gas for preventing oxidization of the suspension resulting from the laser light irradiation may be sprayed on a spot on the suspension to be irradiated with the laser light. In this case, it is possible to prevent discoloration of the suspension resulting from oxidization.

In the load adjusting method or apparatus of the invention, one of the two surfaces of the load beam maybe selectively irradiated with laser light to thereby adjust the load. In this case, it becomes easier to increase and decrease the load for adjustment.

In the load adjusting method or apparatus of the invention, a parameter indicating an attitude of the suspension which is correlated with the load may be measured and, conditions under which heat energy is applied to the suspension may be controlled based on the measured parameter. In this case, it is possible to perform adjustment of the load easily, without measuring the load.

Obviously many modifications and variations of the present invention are possible in light of the above teachings. It is therefore to be understood that within the scope of the appended claims the invention may be practiced otherwise than as specifically described.

What is claimed is:

1. A method for adjusting a load applied to a flying-type head slider by a suspension that supports the slider, the load being applied under conditions equivalent to those where the slider is flying, the suspension including a load beam for generating the load, the load beam being shaped like a plate spring and having two separate bent sections, the method including the steps of:

holding the suspension while no external force to bend the suspension is applied to the suspension; and applying heat energy to at least one of the two bent sections to increase the load and to correct a roll angle of the suspension.

2. A method according to claim 1, wherein the at least one of the bent sections is irradiated with laser light in the step of applying heat energy.

3. A method according to claim 2, wherein gas for preventing oxidization of the suspension resulting from the irradiation with laser light is sprayed on a spot on the suspension to be irradiated with the laser light.

4. A method according to claim 2, wherein the load beam has two surfaces that face toward opposite directions, and, one of the two surfaces of the load beam is selectively irradiated with the laser light in the step of applying heat energy.

5. A method according to claim 1, wherein:

the method further includes, before the step of applying heat energy, a step of measuring a parameter indicating an attitude of the suspension which is correlated with the load; and in the step of applying heat energy, conditions under which heat energy is applied to the suspension are controlled based on the measured parameter.

6. A method according to claim 1, further including a step of measuring the load and determining whether the load is within a specified range, before and after the step of applying heat energy.

7. A method according to claim 1, further comprising the step of applying heat energy to at least one of the two bent sections to decrease the load and to correct a roll angle of the suspension.

8. An apparatus for adjusting a load applied to a flying-type head slider by a suspension that supports the slider, the load being applied under conditions equivalent to those where the slider is flying, the suspension including a load beam for generating the load, the load beam being shaped like a plate spring and having two separate bent sections, the apparatus comprising:

holding means for holding the suspension while no external force to bend the suspension is applied to the suspension; and heat energy applying means for applying heat energy to at least one of the two bent sections to increase the load and to correct a roll angle of the suspension.

9. An apparatus according to claim 8, wherein the heat energy applying means has a laser light irradiating device for irradiating the at least one of the bent sections with laser light.

10. An apparatus according to claim 9, further comprising gas injecting means for spraying gas for preventing oxidization of the suspension resulting from the irradiation with laser light on a spot on the suspension to be irradiated with the laser light.

11. An apparatus according to claim 9, wherein the load beam has two surfaces that face toward opposite directions, and the laser light irradiating device irradiates one of the two surfaces of the load beam selectively with the laser light.

12. An apparatus according to claim 8, further comprising: attitude measuring means for measuring a parameter indicating an attitude of the suspension which is correlated with the load; and controlling means for controlling conditions under which heat energy is applied to the suspension, based on the parameter measured by the attitude measuring means.

13. An apparatus according to claim 8, further comprising load measuring means for measuring the load.

14. An apparatus according to claim 8, wherein the heat energy applying means further comprises means for applying heat energy to at least one of the two bent sections to decrease the load and to correct a roll angle of the suspension.

15. An apparatus for adjusting a load applied to a flying-type head slider by a suspension that supports the slider, the load being applied under conditions equivalent to those where the slider is flying, the suspension including a load beam for generating the load, the load beam being shaped like a plate spring and having two separate bent sections, the apparatus comprising:

a holder for holding the suspension while no external force to bend the suspension is applied to the suspension; and a heat energy applying device for applying heat energy to at least one of the two bent sections to increase the load and to correct a roll angle of the suspension.

16. An apparatus according to claim 15, wherein the heat energy applying device has a laser light irradiating device for irradiating the at least one of the bent sections with laser light.

17. An apparatus according to claim 16, further comprising a gas injecting device for spraying gas for preventing oxidization of the suspension resulting from the irradiation with laser light on a spot on the suspension to be irradiated with the laser light.

18. An apparatus according to claim 16, wherein the load beam has two surfaces that face toward opposite directions, and the laser light irradiating device irradiates one of the two surfaces of the load beam selectively with the laser light.

19. An apparatus according to claim 15, further comprising: a position measuring instrument for measuring a parameter indicating an attitude of the suspension which is correlated with the load; and a controlling device for controlling conditions under which heat energy is applied to the suspension, based on the parameter measured by the position measuring instrument.

20. An apparatus according to claim 15, further comprising a load measuring instrument for measuring the load.

21. An apparatus according to claim 15, wherein the heat energy applying device applies heat energy to at least one of the two bent sections to decrease the load and to correct a roll angle of the suspension.

* * * * *